United States Patent
Bai et al.

(10) Patent No.: US 11,616,557 B2
(45) Date of Patent: Mar. 28, 2023

(54) INDICATING BEAM FAILURE FOR MULTIPLE CELLS

(71) Applicant: QUALCOMM Incorporated, San Diego, CA (US)

(72) Inventors: Tianyang Bai, Somerville, NJ (US); Yan Zhou, San Diego, CA (US); Jung Ho Ryu, Fort Lee, NJ (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/949,215

(22) Filed: Oct. 20, 2020

(65) Prior Publication Data

US 2021/0126693 A1     Apr. 29, 2021

Related U.S. Application Data

(60) Provisional application No. 62/925,608, filed on Oct. 24, 2019.

(51) Int. Cl.
    *H04B 7/06*            (2006.01)
    *H04W 72/044*       (2023.01)
                     (Continued)

(52) U.S. Cl.
    CPC ........ *H04B 7/0695* (2013.01); *H04W 72/046* (2013.01); *H04W 72/14* (2013.01); *H04W 76/19* (2018.02)

(58) Field of Classification Search
    CPC .. H04B 7/0695; H04W 76/19; H04W 72/046; H04W 72/14; H04W 7/088; H04W 36/0033; H04W 16/28; H04W 28/12
    See application file for complete search history.

(56) References Cited

U.S. PATENT DOCUMENTS

2019/0037423 A1    1/2019   Yu et al.
2019/0081753 A1*   3/2019   Jung ...................... H04B 7/088
(Continued)

FOREIGN PATENT DOCUMENTS

WO     WO-2018204255 A1 * 11/2018 ............ H04W 76/19
WO     WO-2019032882 A1    2/2019

OTHER PUBLICATIONS

ASUSTEK: "Discussion on Beam Failure Recovery Request in NR", 3GPP Draft, 3GPP TSG-RAN WG2 Meeting #101bis, R2-1804288, 3rd Generation Partnership Project (3GPP), Mobile Competence Centre, 650, Route Des Lucioles, F-06921 Sophia-Antipolis Cedex, France, vol. RAN WG2, No. Sanya, China, Apr. 16, 2018-Apr. 20, 2018, Apr. 14, 2018 (Apr. 14, 2018), XP051428044, 3 Pages, Retrieved from the Internet: URL: http://www.3gpp.org/ftp/Meetings%5F3GPP%5FSYNC/RAN2/Docs/. [retrieved on Apr. 14, 2018] Chapter 3. Conclusion.
(Continued)

*Primary Examiner* — Mewale A Ambaye
(74) *Attorney, Agent, or Firm* — Qualcomm Incorporated

(57) ABSTRACT

Various aspects of the present disclosure generally relate to wireless communication. In some aspects, a user equipment (UE) may detect a beam failure associated with a cell of a plurality of cells. The UE may selectively transmit a beam failure recovery request (BFRQ) communication for the cell based at least in part on a determination of whether a threshold time period has elapsed since a previous BFRQ communication was transmitted for the cell or another cell of the plurality of cells. Numerous other aspects are provided.

30 Claims, 7 Drawing Sheets

(51) Int. Cl.
*H04W 72/14* (2009.01)
*H04W 76/19* (2018.01)

(56) References Cited

U.S. PATENT DOCUMENTS

| | | | | |
|---|---|---|---|---|
| 2019/0089579 A1* | 3/2019 | Sang | ............ | H04W 76/27 |
| 2019/0166555 A1* | 5/2019 | Cheng | ............ | H04B 7/0695 |
| 2019/0215048 A1* | 7/2019 | Cirik | ............ | H04B 7/088 |
| 2019/0215863 A1* | 7/2019 | Kim | ............ | H04W 76/19 |
| 2019/0245737 A1* | 8/2019 | Zhou | ............ | H04B 7/06 |
| 2019/0253966 A1* | 8/2019 | Park | ............ | H04L 5/0091 |
| 2020/0314745 A1* | 10/2020 | Yi | ............ | H04W 72/14 |
| 2020/0314889 A1* | 10/2020 | Cirik | ............ | H04W 72/14 |

OTHER PUBLICATIONS

International Search Report and Written Opinion—PCT/US2020/070679—ISA/EPO—dated Feb. 11, 2021.

Nokia et al., "SCell Beam Failure Recovery", 3GPP Draft; R2-1805342 Scell Beam Failure Recovery, 3rd Generation Partnership Project (3GPP), Mobile Competence Centre; 650, Route Des Lucioles ; F-06921 Sophia-Antipolis Cedex ; France, vol. RAN WG2, No. Sanya, China; Apr. 16, 2018-Apr. 20, 2018, Apr. 6, 2018 (Apr. 6, 2018), XP051415970, 3 Pages, Retrieved from the Internet: URL:http://www.3gpp.org/ftp/tsg%5Fran/WG2%5FRL2/TSGR2%5F101bis/Docs/ [retrieved on Apr. 6, 2018] p. 1, paragraph 2.1-p. 2, paragraph 2.3.

Spreadtrum Communications: "Discussion on UE Initiated Recovery from Beam Failure", 3GPP Draft, 3GPP TSG RAN WG1 Meeting #90, R1-1713047, Discussion on UE Initiated Recovery from Beam Failure Final, 3rd Generation Partnership Project (3GPP), Mobile Competence Centre, 650, Route Des Lucioles, F-06921 Sophia-Ant, vol. RAN WG1, No. Prague, Czech Republic, Aug. 21, 2017-Aug. 25, 2017, Aug. 20, 2017 (Aug. 20, 2017), XP051315856, 6 Pages, Retrieved from the Internet: URL: http://www.3gpp.org/ftp/Meetings_3GPP_SYNC/RAN1/Docs/. [retrieved on Aug. 20, 2017] Chapter 2.5 UE behaviour after initially transmitting beam failure recovery request signal.

* cited by examiner

INDICATING BEAM FAILURE FOR MULTIPLE CELLS

CROSS-REFERENCE TO RELATED APPLICATION

This Patent Application claims priority to U.S. Provisional Patent Application No. 62/925,608, filed on Oct. 24, 2019, entitled "INDICATING BEAM FAILURE FOR MULTIPLE CELLS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indicating beam failure for multiple cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include detecting a beam failure associated with a cell of a plurality of cells; and selectively transmitting a beam failure recovery request (BFRQ) communication for the cell based at least in part on a determination of whether a threshold time period has elapsed since a previous BFRQ communication was transmitted for the cell or another cell of the plurality of cells.

In some aspects, a UE for wireless communication may include memory and one or more processors operatively coupled to the memory. The memory and the one or more processors may be configured to detect a beam failure associated with a cell of a plurality of cells; and selectively transmit a BFRQ communication for the cell based at least in part on a determination of whether a threshold time period has elapsed since a previous BFRQ communication was transmitted for the cell or another cell of the plurality of cells.

In some aspects, a non-transitory computer-readable medium may store one or more instructions for wireless communication. The one or more instructions, when executed by one or more processors of a UE, may cause the one or more processors to: detect a beam failure associated with a cell of a plurality of cells; and selectively transmit a BFRQ communication for the cell based at least in part on a determination of whether a threshold time period has elapsed since a previous BFRQ communication was transmitted for the cell or another cell of the plurality of cells.

In some aspects, an apparatus for wireless communication may include means for detecting a beam failure associated with a cell of a plurality of cells; and means for selectively transmitting a BFRQ communication for the cell based at least in part on a determination of whether a threshold time period has elapsed since a previous BFRQ communication was transmitted for the cell or another cell of the plurality of cells.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
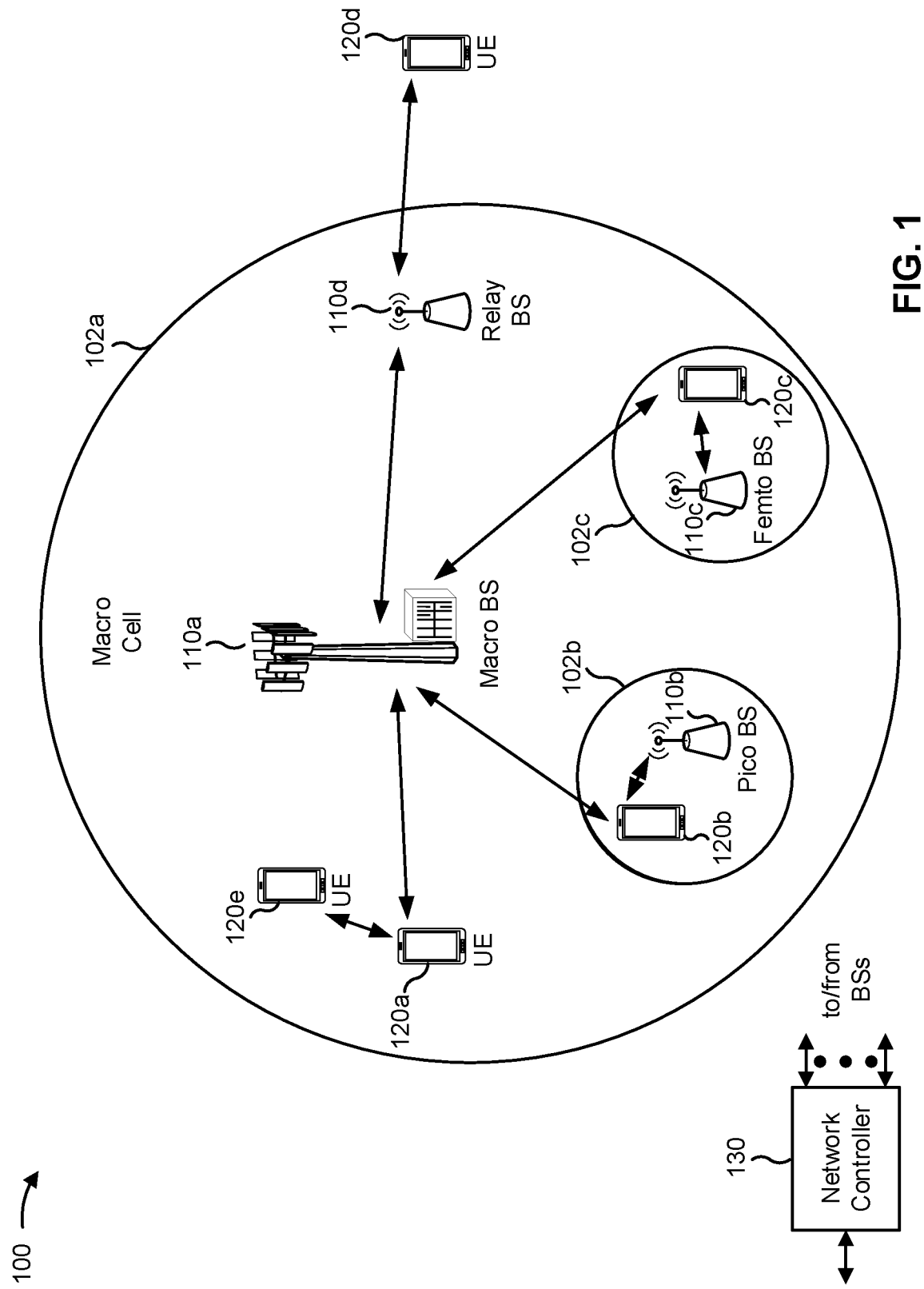
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay base station 110d may communicate with macro BS 110a and a UE 120d in order to facilitate communication between BS 110a and UE 120d. A relay base station may also be referred to as a relay BS, a relay station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
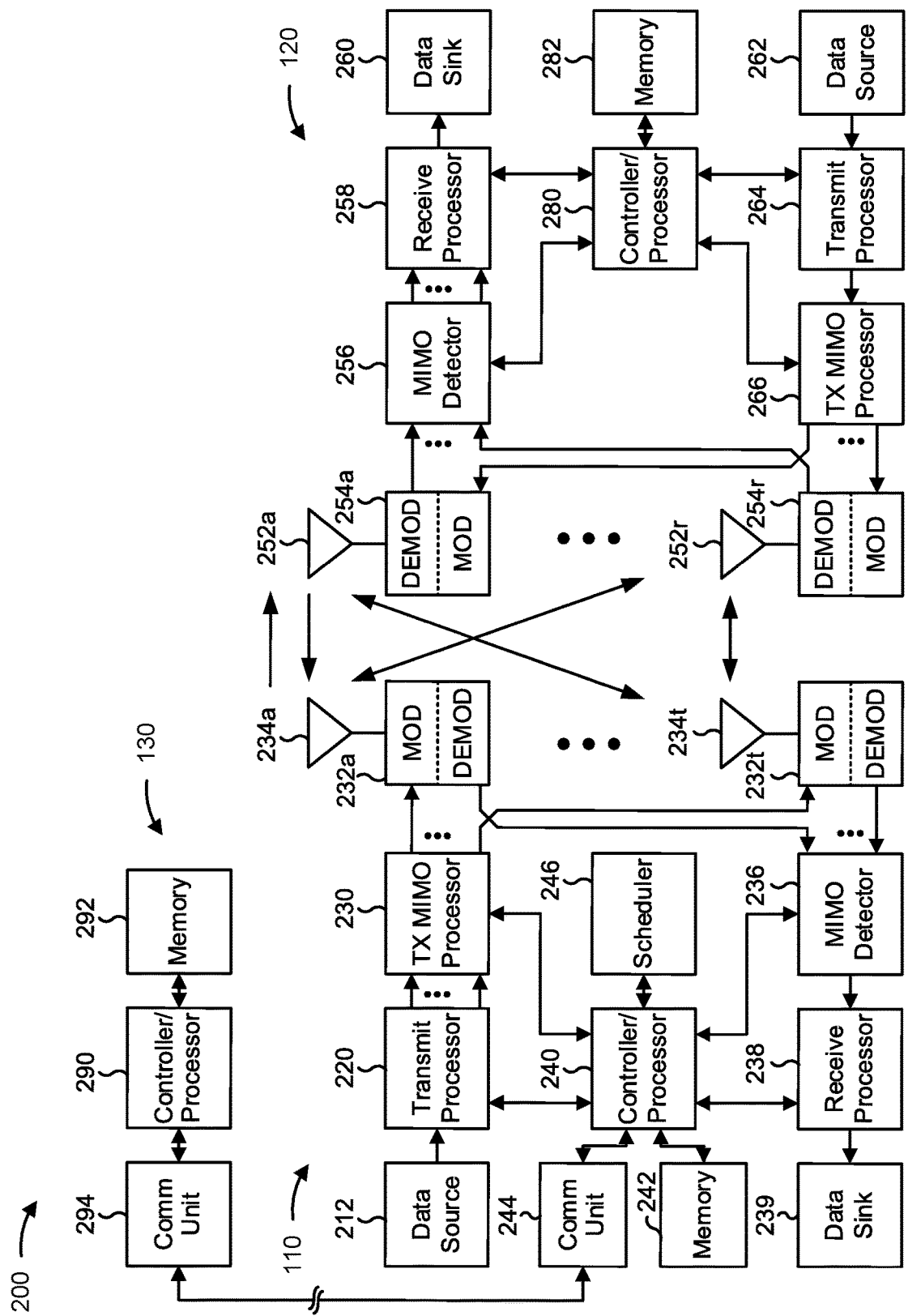
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating beam failure for multiple cells, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, and/or other processes as described herein. A scheduler 246 may schedule UEs for data transmission on the downlink and/or uplink.

In some aspects, UE 120 may include means for detecting a beam failure associated with a cell of a plurality of cells, means for selectively transmitting a beam failure recovery request (BFRQ) communication for the cell based at least in part on a determination of whether a threshold time period has elapsed since a previous BFRQ communication was transmitted for the cell or another cell of the plurality of cells, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
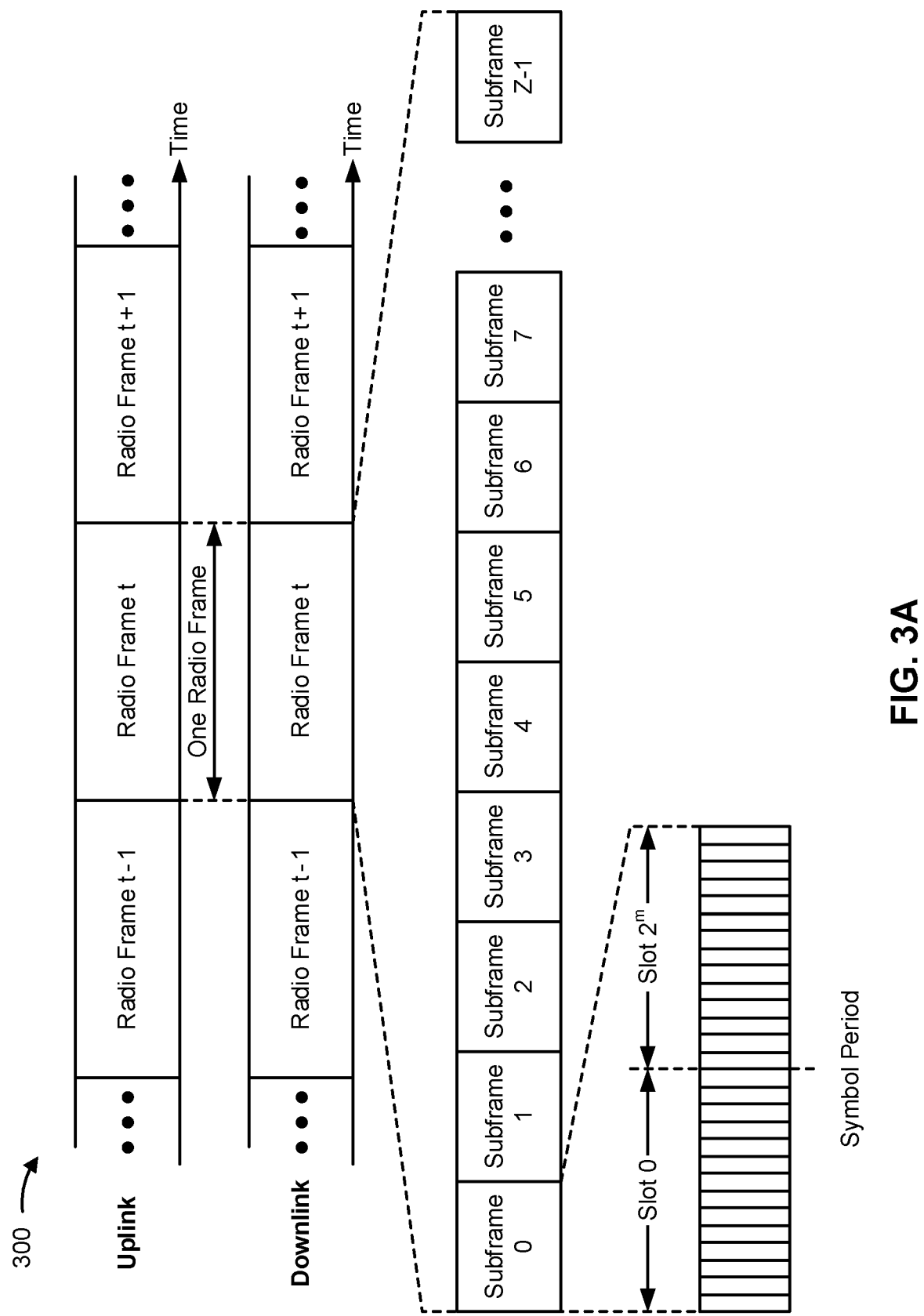
FIG. 3A is a block diagram illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z-1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L-1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, "wireless communication structure" may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
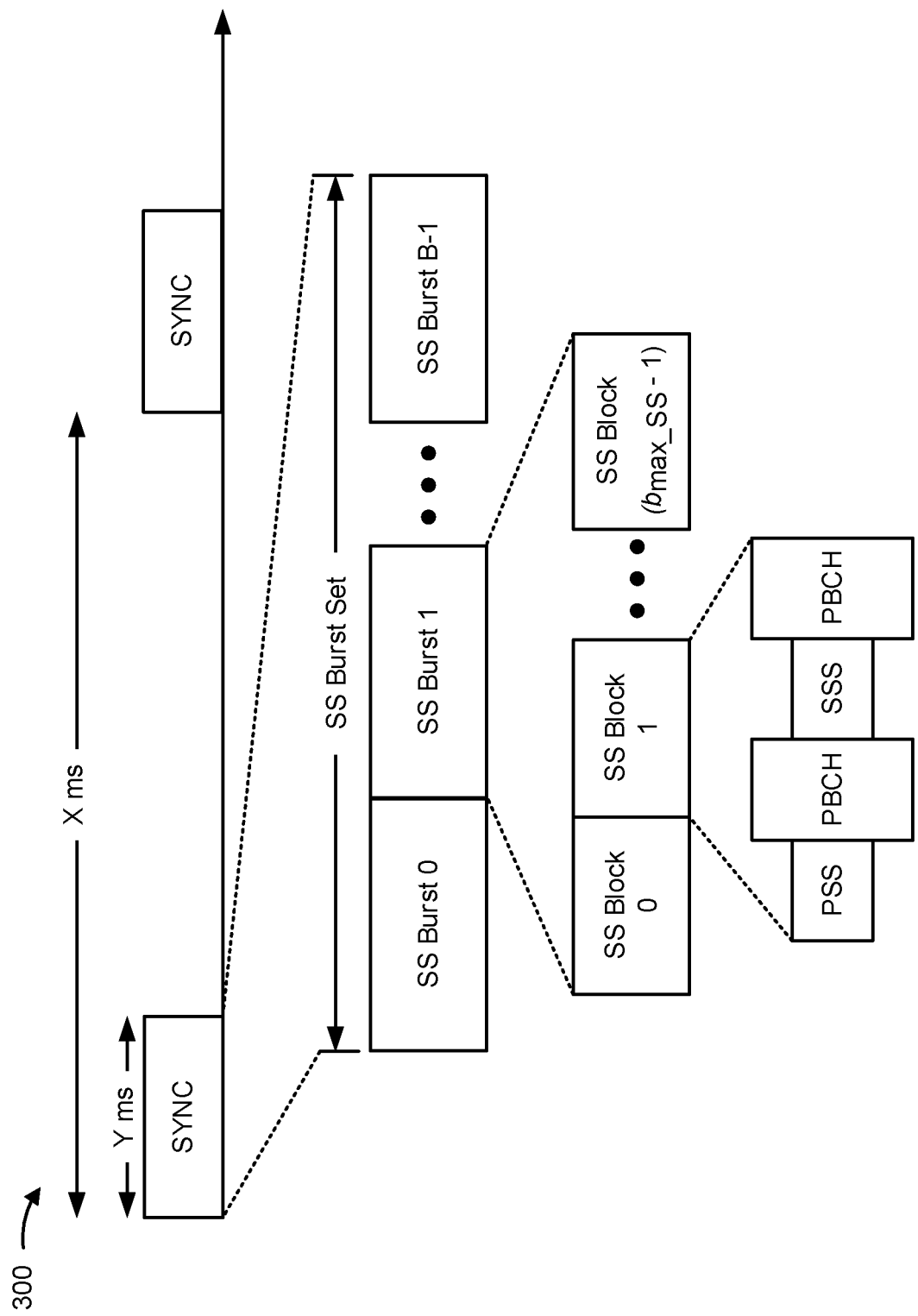
FIG. 3B is a block diagram illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
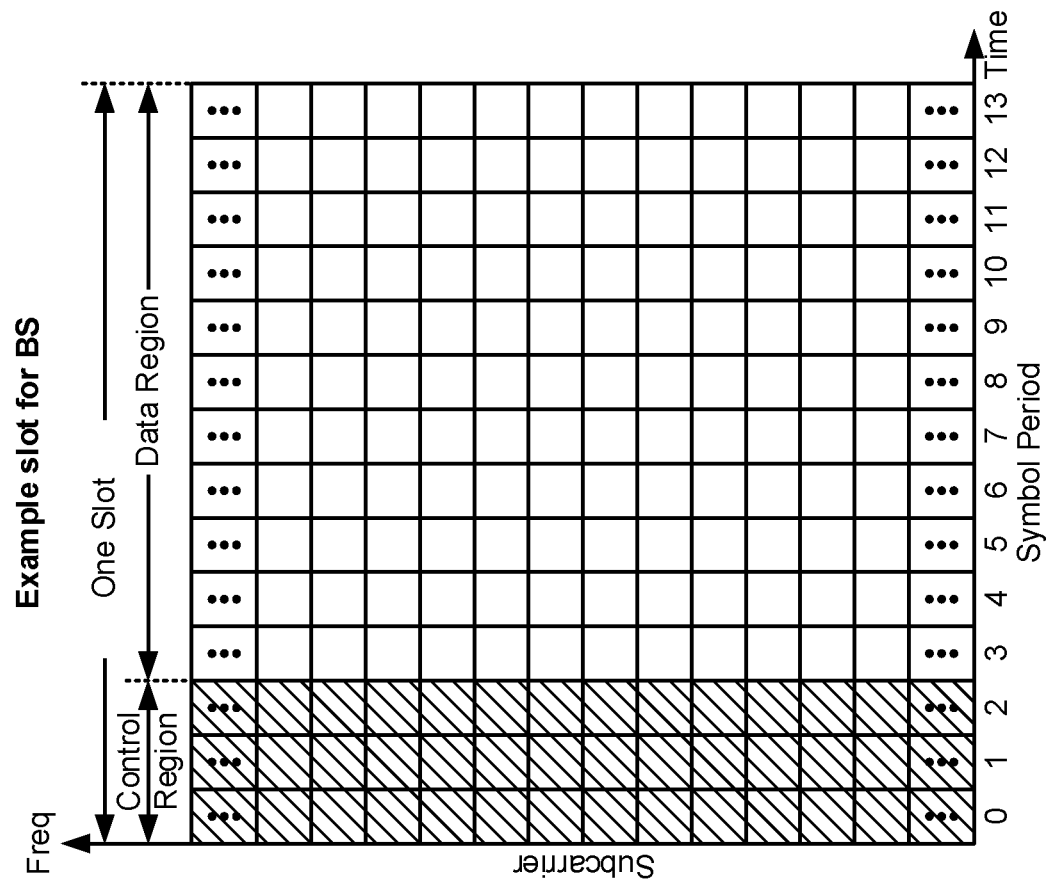
FIG. 4 is a block diagram illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a BS and a UE may communicate over a downlink channel. In some cases, the BS may aggregate a plurality of radio frequency carriers for the downlink channel, which may be referred to as carrier aggregation. Carrier aggregation may increase the bandwidth of the downlink channel, which in turn may increase throughput on the downlink channel, increase reliability of the downlink channel, decrease latency on the downlink channel, and/or the like. Each radio frequency carrier in a carrier-aggregated downlink channel may be referred to as a component carrier (CC). Moreover, each CC may be associated with a serving cell of the BS. For example, a primary CC may be associated with a primary cell, and a secondary CC may be associated with a secondary cell. In some cases, the UE may communicate with a primary cell and/or one or more secondary cells that belong to a physical uplink control channel (PUCCH) group. A "PUCCH group" may refer to a group of cells that includes a PUCCH cell (e.g., a primary cell, if one PUCCH group is configured, or the primary cell and a secondary cell, if two PUCCH groups are configured) that may be used for all PUCCH communications for the PUCCH group.

In some cases, the UE may establish communications with each cell served by a CC via a respective beam. To provide failure detection of the beams, the BS may transmit on each cell a respective beam failure detection reference signal (BFD-RS). The UE may perform one or more measurements of a BFD-RS and may determine whether a corresponding beam has failed based at least in part on the one or more measurements.

If the UE detects a beam failure associated with a cell, the UE may transmit a beam failure recovery request (BFRQ) communication (e.g., of a BFRQ procedure) on a PUCCH cell (e.g., a primary cell) using a resource that was allocated to the UE for transmitting BFRQ communications. In some cases, the UE may be allocated a plurality of resources (e.g., dedicated resources) for transmitting BFRQ communications, each resource being for a bandwidth part (BWP) in connection with a particular PUCCH group. In some aspects, the UE may select one of the plurality of resources for transmitting the BFRQ communication. In some aspects, the UE may use only a resource of the plurality of resources that is associated with the particular PUCCH group to which the BFRQ communication relates. In some cases, the UE may be allocated a single resource (e.g., a dedicated resource) for transmitting BFRQ communications, and the UE may use the resource for all BFRQ communications of the UE.

In some aspects, as a response to the BFRQ communication, the UE may receive on the PUCCH cell an uplink grant for a physical uplink shared channel (PUSCH) communication of the UE in connection with the BFRQ procedure. The UE may transmit an uplink communication, in accordance with the uplink grant, that may indicate a CC identifier (e.g., index), a cell identifier (e.g., index), and/or the like, associated with the failed beam as well as a candidate beam for replacing the failed beam. Since carrier aggregation results in a greater quantity of CCs being aggregated for the UE, the signaling overhead to report individual beam failures for a plurality of cells may be inefficient and may result in the consumption of significant radio resources, UE resources (e.g., battery power, processing resources, memory resources, communication resources, and/or the like), and BS resources (e.g., processing resources, memory resources, communication resources, and/or the like).

Some techniques and apparatuses described herein regulate transmission of a BFRQ communication by a UE (e.g., UE 120). In some aspects, the UE may be permitted to transmit a BFRQ communication after a threshold time period has elapsed since a previous BFRQ communication was transmitted by the UE. Additionally, or alternatively, the UE may be permitted to transmit a BFRQ communication if a quantity of BFRQ communications transmitted by the UE does not exceed a threshold value. In this way, the UE may avoid transmitting unnecessary or redundant BFRQ communications, thereby reducing signaling overhead and consumption of radio resources, UE resources, and/or BS resources.

Figure 5:
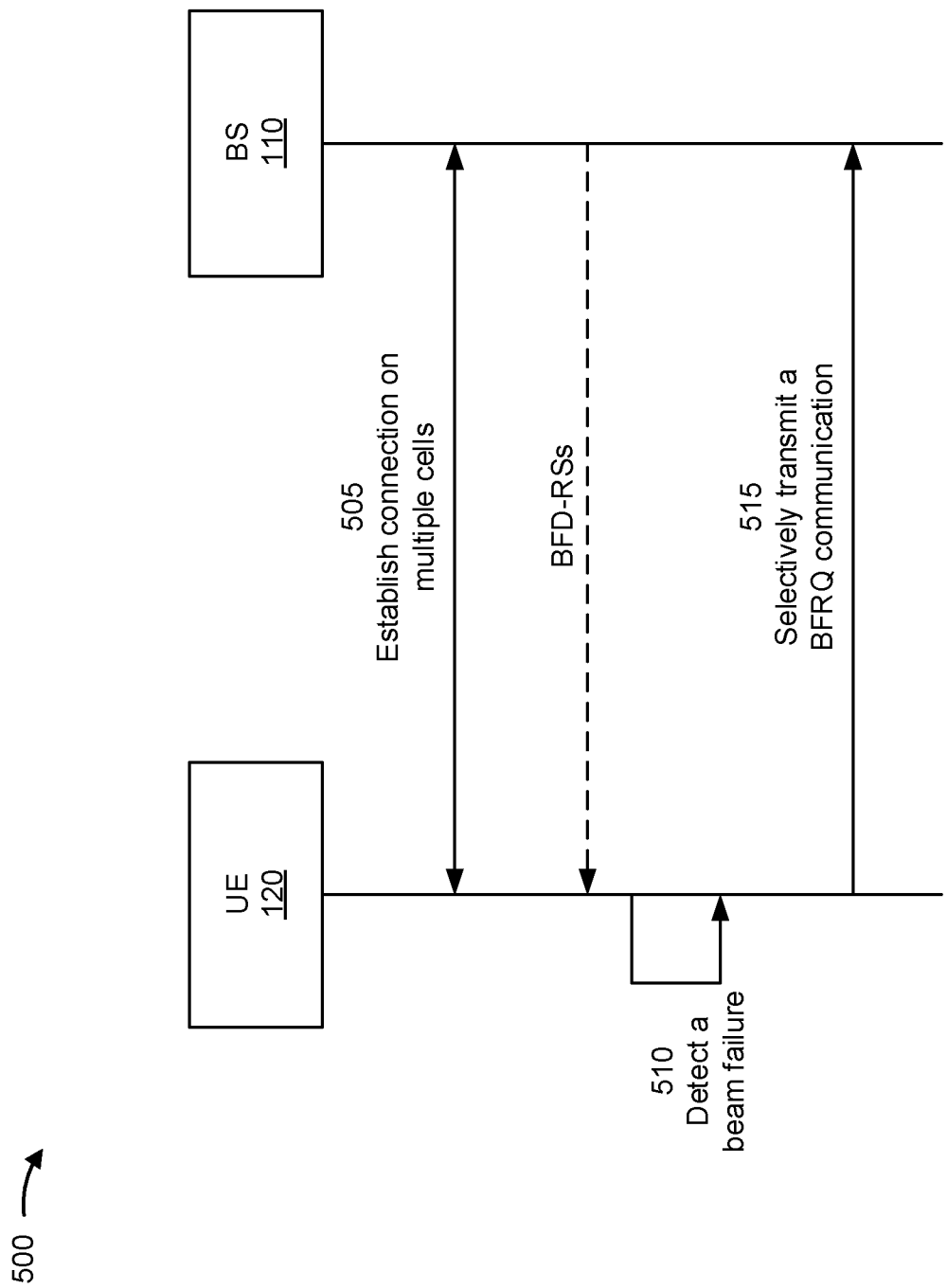
FIG. 5 is a diagram illustrating an example associated with indicating beam failure for multiple cells, in accordance with various aspects of the present disclosure.

FIG. 5 is a diagram illustrating an example 500 associated with indicating beam failure for multiple cells, in accordance with various aspects of the present disclosure. As shown in FIG. 5, example 500 includes communication between a BS 110 and a UE 120. In some aspects, the BS 110 and the UE 120 may be included in a wireless network, such as wireless network 100. The BS 110 and the UE 120 may communicate on a wireless access link, which may include an uplink and a downlink.

As shown by reference number 505, the UE 120 may establish a connection with the BS 110 on multiple cells (e.g., multiple CCs). For example, the UE 120 may establish a connection with the BS 110 on a primary cell (PCell) and one or more secondary cells (SCells). Accordingly, the UE 120 and the BS 110 may communicate on the primary cell and the secondary cell(s). For example, the UE 120 and the BS 110 may communicate on the primary cell using a first beam (e.g., a first beam direction) and on a secondary cell using a second beam (e.g., a second beam direction). In some aspects, the primary cell and one or more secondary cells may be configured as a PUCCH group, and the UE 120 may use the primary cell for PUCCH transmissions for all cells of the PUCCH group. In some aspects, at least one secondary cell may be configured as a PUCCH group, and the UE 120 may use the secondary cell for PUCCH transmissions for all cells of the PUCCH group.

As shown by reference number 510, the UE 120 may detect a beam failure associated with a secondary cell. For example, the UE 120 may perform measurement of a BFD-RS transmitted by the BS 110 on a cell to detect a beam failure for the cell. The UE 120 may determine the beam failure if a quality, a received power, and/or the like, associated with the BFD-RS, does not satisfy a threshold value.

As shown by reference number 515, the UE 120 may selectively transmit to the BS 110 a BFRQ communication (which also may be referred to as a scheduling request for beam failure recovery) based at least in part on detecting a beam failure associated with a secondary cell. In some aspects, the UE may detect a beam failure associated with a secondary cell, and may transmit, on a PUCCH cell associated with the secondary cell, a BFRQ communication for the secondary cell based at least in part on a determination that a threshold time period has elapsed since a previous BFRQ communication was transmitted by the UE. In some aspects, the previous BFRQ communication may relate to the secondary cell or another secondary cell with which the UE has established communications. For example, the secondary cell and the other secondary cell may be in the same PUCCH group.

In some aspects, the UE may use a timer (e.g., an sr-ProhibitTimer) to determine when the threshold time period for transmitting the BFRQ communication has elapsed. That is, the timer may expire when the threshold time period elapses. The UE may initiate the timer when the previous BFRQ communication is transmitted by the UE. Prior to expiration of the timer, the UE may not transmit the BFRQ communication. In some aspects, the UE may queue the BFRQ communication, or delay generation of the BFRQ communication, while awaiting expiration of the timer.

In some aspects, such as when the UE is enabled to transmit BFRQ communications in one of a plurality of resources allocated to the UE, after the previous BFRQ communication is transmitted in one of the plurality of resources, the UE may not transmit the BFRQ communication in the same resource of the plurality of resources, or in any of the plurality of resources, until expiration of the timer (e.g., the threshold time period has elapsed). That is, the timer may relate to BFRQ communications transmitted in a particular resource, or the timer may relate to BFRQ communications transmitted in any of the plurality of resources. In some aspects, such as when the UE is enabled to transmit BFRQ communications in a particular resource allocated to the UE, after the previous BFRQ communication is transmitted in the resource, the UE may not transmit the BFRQ communication in the resource until expiration of the timer (e.g., the threshold time period has elapsed). For example, if the UE is enabled to transmit BFRQ communications for a PUCCH group using the particular resource, the UE may not transmit more than one BFRQ communication for the PUCCH group within the threshold time period.

In some aspects, the UE may cancel the timer prior to expiration of the timer (e.g., before the threshold time period has elapsed), thereby enabling the UE to transmit the BFRQ communication within the threshold time period. For example, if the UE receives an uplink grant (e.g., on the PUCCH cell) in response to the previous BFRQ communication, the UE may cancel the timer and transmit the BFRQ communication prior to expiration of the timer. In such cases, the previous BFRQ communication and the BFRQ communication may relate to the same secondary cell.

In some aspects, the UE may not transmit the BFRQ communication based at least in part on a determination that a quantity of BFRQ communications transmitted by the UE satisfies a threshold value. For example, the UE may not transmit the BFRQ communication, relating to a particular secondary cell, if a quantity of BFRQ communications (e.g., sr-TransMax) transmitted for the secondary cell satisfies the threshold value. In some aspects, the UE may be configured (e.g., by radio resource control signaling), or otherwise provisioned, with the quantity of BFRQ communications that is to be used.

In some aspects, the UE may use a counter (e.g., an SR COUNTER) to determine a quantity of BFRQ communications that have been transmitted by the UE. Thus, a counter may provide an indication of when the UE is to discontinue transmitting BFRQ communications (e.g., the counter satisfying the threshold value may indicate a radio link failure with the PUCCH cell). In some aspects, a counter may be associated with a particular secondary cell. For example, the UE may increment a counter for the secondary cell each time a BFRQ communication is transmitted for the secondary cell.

In some aspects, such as when the UE is enabled to transmit BFRQ communications in one of a plurality of resources allocated to the UE, the UE may increment a counter when a BFRQ communication (e.g., relating to a particular secondary cell associated with the counter) is transmitted in any of the plurality of resources, or in a particular resource of the plurality of resources. That is, the counter may relate to BFRQ communications transmitted in a particular resource, or the counter may relate to BFRQ communications transmitted in any of the plurality of resources. In some aspects, such as when the UE is enabled to transmit BFRQ communications in a particular resource allocated to the UE, the UE may increment a counter when a BFRQ communication (e.g., relating to a particular secondary cell associated with the counter) is transmitted in the particular resource.

In such cases, when the counter satisfies the threshold value, the UE may discontinue transmitting BFRQ communications (e.g., relating to the secondary cell associated with the counter). Accordingly, one or more queued or delayed BFRQ communications (e.g., queued or delayed BFRQ communications awaiting expiration of the timer, as described above) may be dropped and the UE may initiate a random access channel (RACH) procedure on the PUCCH cell (e.g., a primary cell, a secondary primary cell, or a secondary cell) for the PUCCH group of the secondary cell associated with the counter.

In some aspects, the counter may be reset to an initial value (e.g., zero), thereby enabling the UE to resume transmitting BFRQ communications after the counter has satisfied the threshold value. For example, if the UE receives an uplink grant (e.g., on the PUCCH cell) as a response to the previous BFRQ communication (e.g., the previous BFRQ communication for a secondary cell associated with the counter), the UE may reset the counter. In some aspects, the UE may drop one or more queued or delayed BFRQ communications based at least in part on receiving the uplink grant. In such a case, the UE may transmit (e.g., on the PUCCH cell) an uplink communication (e.g., in accordance with the uplink grant) that indicates, for each of the one or more dropped BFRQ communications, a respective CC or cell identifier and a respective candidate beam for replacing the respective failed beam associated with the one or more dropped BFRQ communications.

In this way, the UE may avoid transmitting unnecessary or redundant BFRQ communications, thereby reducing signaling overhead and consumption of radio resources, UE resources, and/or base station resources.

As indicated above, FIG. 5 is provided as an example. Other examples may differ from what is described with respect to FIG. 5.

Figure 6:
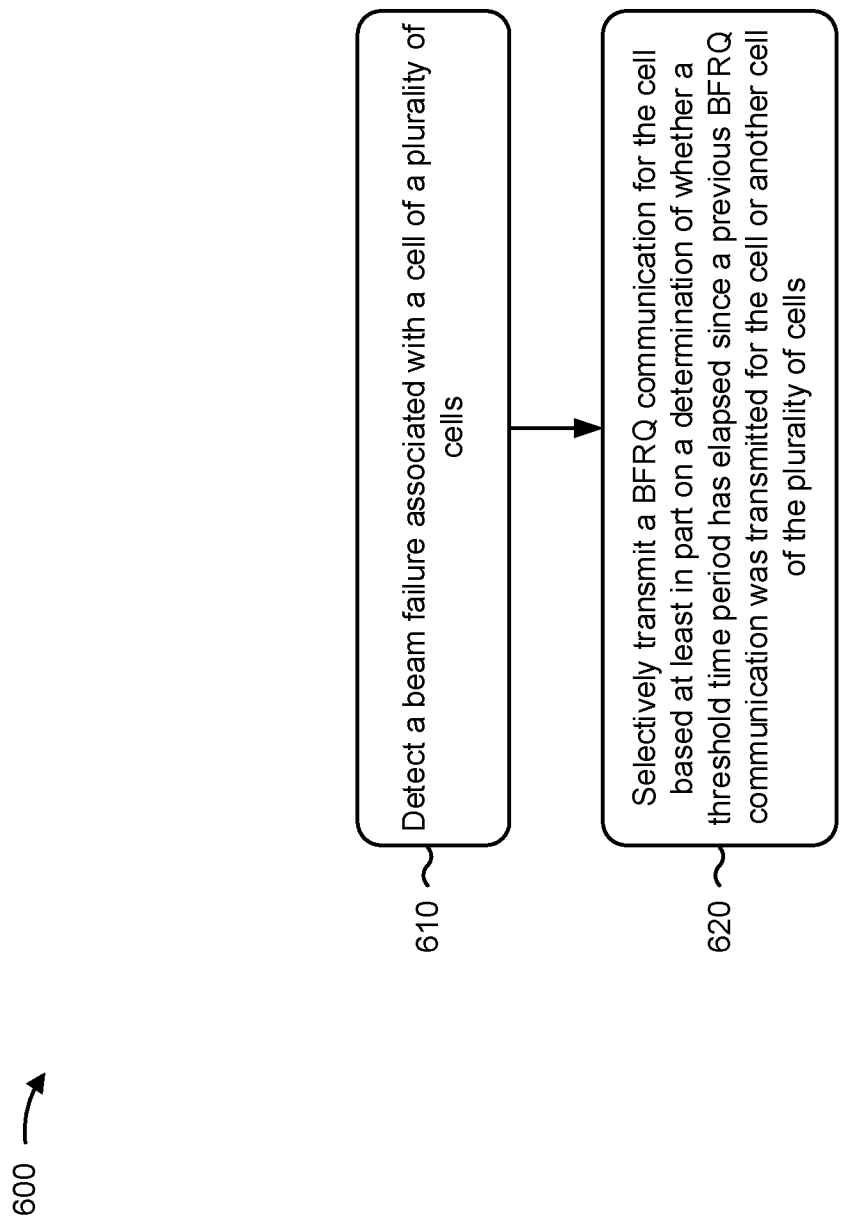
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 and/or the like) performs operations associated with indicating beam failure for multiple cells.

As shown in FIG. 6, in some aspects, process 600 may include detecting a beam failure associated with a cell of a plurality of cells (block 610). For example, the UE (e.g., using antenna 252, DEMOD 254, MIMO detector 256, receive processor 258, controller/processor 280, and/or the like) may detect a beam failure associated with a cell of a plurality of cells, as described above.

As further shown in FIG. 6, in some aspects, process 600 may include selectively transmitting a BFRQ communication for the cell based at least in part on a determination of whether a threshold time period has elapsed since a previous BFRQ communication was transmitted for the cell or another cell of the plurality of cells (block 620). For example, the UE (e.g., using controller/processor 240, transmit processor 220, TX MIMO processor 230, MOD 232, antenna 234, and/or the like) may selectively transmit a BFRQ communication for the cell based at least in part on a determination of whether a threshold time period has elapsed since a previous BFRQ communication was transmitted for the cell or another cell of the plurality of cells, as described above.

Process 600 may include additional aspects, such as any single aspect or any combination of aspects described below and/or in connection with one or more other processes described elsewhere herein.

In a first aspect, the plurality of cells belong to a PUCCH group.

In a second aspect, alone or in combination with the first aspect, the UE is to use one of a plurality of resources for transmitting the BFRQ communication, the previous BFRQ communication was transmitted in a first resource of the plurality of resources, and the BFRQ communication is transmitted in the first resource or a second resource of the plurality of resources based at least in part on the determination that the threshold time period has elapsed. In a third aspect, alone or in combination with one or more of the first and second aspects, the UE is to use a resource for transmitting the BFRQ communication, the previous BFRQ communication was transmitted in the resource, and the BFRQ communication is transmitted in the resource based at least in part on the determination that the threshold time period has elapsed.

In a fourth aspect, alone or in combination with one or more of the first through third aspects, the BFRQ communication is transmitted prior to the threshold time period having elapsed based at least in part on receiving an uplink grant as a response to the previous BFRQ communication.

In a fifth aspect, alone or in combination with one or more of the first through fourth aspects, process 600 further includes transmitting the previous BFRQ communication, and initiating a timer associated with the threshold time period based at least in part on transmitting the previous BFRQ communication.

In a sixth aspect, alone or in combination with one or more of the first through fifth aspects, the UE is to use one of a plurality of resources for transmitting the BFRQ communication, and the BFRQ communication is not transmitted based at least in part on a determination that a quantity of BFRQ communications, transmitted in one or more of the plurality of resources, satisfies a threshold value. In a seventh aspect, alone or in combination with one or more of the first through sixth aspects, process 600 further includes initiating a random access channel procedure based at least in part on a determination that the quantity of BFRQ communications for satisfies the threshold value.

In an eighth aspect, alone or in combination with one or more of the first through seventh aspects, the UE is to use a resource for transmitting the BFRQ communication, and the BFRQ communication is not transmitted based at least in part on a determination that a quantity of BFRQ communications, transmitted in the resource, satisfies a threshold value. In a ninth aspect, alone or in combination with one or more of the first through eighth aspects, process 600 further includes initiating a random access channel procedure based at least in part on a determination that the quantity of BFRQ communications satisfies the threshold value.

In a tenth aspect, alone or in combination with one or more of the first through ninth aspects, process 600 further includes transmitting the previous BFRQ communication in a resource allocated to the UE for transmitting BFRQ communications, and incrementing a counter associated with the resource based at least in part on transmitting the previous BFRQ communication. In an eleventh aspect, alone or in combination with one or more of the first through tenth aspects, process 600 further includes resetting the counter based at least in part on receiving an uplink grant as a response to the previous BFRQ communication. In a twelfth aspect, alone or in combination with one or more of the first through eleventh aspects, the BFRQ communication is not transmitted based at least in part on receiving the uplink grant, and process 600 further includes transmitting an uplink communication according to the uplink grant that identifies at least one of the cell or a candidate beam for the cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    detecting a beam failure associated with a first secondary cell of a plurality of cells, the plurality of cells including the first secondary cell, a second secondary cell, and a primary cell; and
    transmitting a beam failure recovery request (BFRQ) communication on the primary cell based at least in part on whether a threshold time period has elapsed since a previous BFRQ communication was transmitted for the first secondary cell or the second secondary cell.

2. The method of claim 1, wherein the plurality of cells belongs to a physical uplink control channel group.

3. The method of claim 1, wherein the UE is to use one of a plurality of resources for transmitting the BFRQ communication, and
wherein the previous BFRQ communication was transmitted in a first resource of the plurality of resources, and the BFRQ communication is transmitted in the first resource or a second resource of the plurality of resources based at least in part on the threshold time period elapsing.

4. The method of claim 1, wherein the UE is to use a resource for transmitting the BFRQ communication, and
wherein the previous BFRQ communication was transmitted in the resource, and the BFRQ communication is transmitted in the resource based at least in part on the threshold time period elapsing.

5. The method of claim 1, wherein the BFRQ communication is transmitted prior to the threshold time period having elapsed based at least in part on receiving an uplink grant as a response to the previous BFRQ communication.

6. The method of claim 1, further comprising:
transmitting the previous BFRQ communication; and
initiating a timer associated with the threshold time period based at least in part on transmitting the previous BFRQ communication.

7. The method of claim 1, wherein the UE is to use one of a plurality of resources for transmitting the BFRQ communication, and
wherein the BFRQ communication is not transmitted based at least in part on a quantity of BFRQ communications, transmitted in one or more of the plurality of resources, satisfying a threshold value.

8. The method of claim 7, further comprising initiating a random access channel procedure based at least in part on the quantity of BFRQ communications satisfying the threshold value.

9. The method of claim 1, wherein the UE is to use a resource for transmitting the BFRQ communication, and
wherein the BFRQ communication is not transmitted based at least in part on a quantity of BFRQ communications, transmitted in the resource, satisfying a threshold value.

10. The method of claim 9, further comprising initiating a random access channel procedure based at least in part on the quantity of BFRQ communications satisfying the threshold value.

11. The method of claim 1, further comprising:
transmitting the previous BFRQ communication in a resource allocated to the UE for transmitting BFRQ communications; and
incrementing a counter associated with the resource based at least in part on transmitting the previous BFRQ communication.

12. The method of claim 11, further comprising resetting the counter based at least in part on receiving an uplink grant as a response to the previous BFRQ communication.

13. The method of claim 12, wherein the BFRQ communication is not transmitted based at least in part on receiving the uplink grant, and
wherein the method further comprises transmitting an uplink communication according to the uplink grant that identifies at least one of the first secondary cell or a candidate beam for the first secondary cell.

14. A user equipment (UE) for wireless communication, comprising:
a memory; and
one or more processors coupled to the memory, the one or more processors configured to:
detect a beam failure associated with a first secondary cell of a plurality of cells, the plurality of cells including the first secondary cell, a second secondary cell, and a primary cell; and
transmit a beam failure recovery request (BFRQ) communication on the primary cell based at least in part on whether a threshold time period has elapsed since a previous BFRQ communication was transmitted for the first secondary cell or the second secondary cell.

15. The UE of claim 14, wherein the plurality of cells belongs to a physical uplink control channel group.

16. The UE of claim 14, wherein the UE is to use one of a plurality of resources for transmitting the BFRQ communication, and
wherein the previous BFRQ communication was transmitted in a first resource of the plurality of resources, and the BFRQ communication is transmitted in the first resource or a second resource of the plurality of resources based at least in part on the threshold time period elapsing.

17. The UE of claim 14, wherein the UE is to use a resource for transmitting the BFRQ communication, and
wherein the previous BFRQ communication was transmitted in the resource, and the BFRQ communication is transmitted in the resource based at least in part on the threshold time period elapsing.

18. The UE of claim 14, wherein the BFRQ communication is transmitted prior to the threshold time period having elapsed based at least in part on receiving an uplink grant as a response to the previous BFRQ communication.

19. The UE of claim 14, wherein the one or more processors are further configured to:
transmit the previous BFRQ communication; and
initiate a timer associated with the threshold time period based at least in part on transmitting the previous BFRQ communication.

20. The UE of claim 14, wherein the UE is to use one of a plurality of resources for transmitting the BFRQ communication, and
wherein the BFRQ communication is not transmitted based at least in part on a quantity of BFRQ communications, transmitted in one or more of the plurality of resources, satisfying a threshold value.

21. The UE of claim 20, wherein the one or more processors are further configured to initiate a random access channel procedure based at least in part on the quantity of BFRQ communications satisfying the threshold value.

22. The UE of claim 14, wherein the UE is to use a resource for transmitting the BFRQ communication, and
wherein the BFRQ communication is not transmitted based at least in part on a quantity of BFRQ communications, transmitted in the resource, satisfying a threshold value.

23. The UE of claim 22, wherein the one or more processors are further configured to initiate a random access channel procedure based at least in part on the quantity of BFRQ communications satisfying the threshold value.

24. The UE of claim 14, wherein the one or more processors are further configured to:

transmit the previous BFRQ communication in a resource allocated to the UE for transmitting BFRQ communications; and increment a counter associated with the resource based at least in part on transmitting the previous BFRQ communication.

25. The UE of claim 24, wherein the one or more processors are further configured to reset the counter based at least in part on receiving an uplink grant as a response to the previous BFRQ communication.

26. The UE of claim 25, wherein the BFRQ communication is not transmitted based at least in part on receiving the uplink grant, and wherein the one or more processors are further configured to transmit an uplink communication according to the uplink grant that identifies at least one of the first secondary cell or a candidate beam for the first secondary cell.

27. A non-transitory computer-readable medium storing a set of instructions for wireless communication, the set of instructions comprising:

one or more instructions that, when executed by one or more processors of a user equipment (UE), cause the UE to:

detect a beam failure associated with a first secondary cell of a plurality of cells, the plurality of cells including the first secondary cell, a second secondary cell, and a primary cell; and transmit a beam failure recovery request (BFRQ) communication on the primary cell based at least in part on whether a threshold time period has elapsed since a previous BFRQ communication was transmitted for the first secondary cell or the second secondary cell.

28. The non-transitory computer-readable medium of claim 27, wherein the plurality of cells belongs to a physical uplink control channel group.

29. An apparatus for wireless communication, comprising:

means for detecting a beam failure associated with a first secondary cell of a plurality of cells, the plurality of cells including the first secondary cell, a second secondary cell, and a primary cell; and means for transmitting a beam failure recovery request (BFRQ) communication on the primary cell based at least in part on whether a threshold time period has elapsed since a previous BFRQ communication was transmitted for the first secondary cell or second secondary cell.

30. The method of claim 1, wherein the previous BFRQ communication was transmitted by the UE.

* * * * *